United States Patent [19]

Lipton

[11] Patent Number: 5,239,372
[45] Date of Patent: Aug. 24, 1993

[54] STEREOSCOPIC VIDEO PROJECTION SYSTEM

[75] Inventor: Lenny Lipton, Greenbrae, Calif.

[73] Assignee: StereoGraphics Corporation, San Rafael, Calif.

[21] Appl. No.: 815,483

[22] Filed: Dec. 31, 1991

[51] Int. Cl.$^5$ .................. H04N 13/00; H04N 13/02
[52] U.S. Cl. .................................. 358/92; 358/88; 359/464
[58] Field of Search ............... 358/3, 88, 91, 92; 359/464, 462, 465

[56] References Cited

U.S. PATENT DOCUMENTS

| | | | |
|---|---|---|---|
| 3,858,001 | 12/1974 | Bonne | 358/92 |
| 4,658,291 | 4/1987 | Morishita | 358/92 |
| 4,719,507 | 1/1988 | Bos | 358/92 |
| 4,772,943 | 9/1988 | Nakagawa et al. | 358/92 |
| 4,792,850 | 12/1988 | Lipton et al. | 358/92 |
| 4,877,307 | 10/1989 | Kalmanash | 358/92 |
| 4,954,890 | 9/1990 | Park | 358/92 |
| 5,001,555 | 3/1991 | Park | 358/92 |
| 5,162,897 | 11/1992 | Jitsukata et al. | 358/3 |

OTHER PUBLICATIONS

"Field-Sequential Electronic Stereoscopic Projector," Lenny Lipton, SPIE vol. 1081 Projection Display. Technology, Systems, and Applications (1989) pp. 94–99.
"100-in. Extra Slim Liquid-Crystal Rear Projection Display," Fukuda, et al., SID 91 Digest, pp. 423–426.
"High-Quality-Image EDTV Liquid-Crystal-Projector", Sakamoto, et al., SID 91 Digest, pp. 419 & 422.
"A 750-TV-Line-Resolution Projector Using 1.5 Megapixel a-Si TFT LC Modules", Takeuchi, et al., SID 91 Digest, pp. 415–418.

Primary Examiner—John K. Peng
Attorney, Agent, or Firm—Limbach & Limbach

[57] ABSTRACT

A method and apparatus for reducing color shift resulting from the stereoscopic display of two polarized images by a pair of polarizing projectors each having a polarizing filter, or increasing the transmission of light which comprises the stereoscopic display, by placing a specially aligned retarder in the optical path between each polarizing projector and the corresponding polarizing filter.

24 Claims, 3 Drawing Sheets

PRIOR ART    Fig. 1

STEREOSCOPIC VIDEO PROJECTION SYSTEM

BACKGROUND OF THE INVENTION

1. Field of the Invention

The invention is a means to correct for color shifts and inaccurate color rendition when using dual video or electronic image projectors to project stereoscopic images using the polarized light method of image selection. The invention is applicable to projectors which inadvertently produce polarized light as a result of their image forming methods. Projectors which use mirror surfaces, semi-silvered or metalized surfaces, dichroic filters, or liquid crystal (LC) display, will produce polarized light and will thus require the corrective means described in this disclosure.

2. Description of the Related Art

Stereoscopic film and video projection systems produce stereoscopic images, which are commonly known as "3-D" images. In one class of conventional projection system, a "3-D" image is produced when two synchronized projectors project polarized left and right images onto the same projection screen. Throughout this disclosure, including in the claims, the expression "synchronized projector" (or "synchronized projection system") denotes a projection system which is controlled to project a left perspective (or right perspective) image simultaneously with projection (by another projection system) of a corresponding right perspective (or left perspective) image, where the images projected by the two projection systems together represent a stereoscopic image.

As shown in FIG. 1, the polarized image of each projector (1, 2) is created by passing a non-polarized image, created by a traditional film projecting system, through a polarizing filter (3 or 4). The orientation of the axes of the polarizing filter for the projectors are typically orthogonal to each other; commonly at 45° and 135°, respectively, from a vertical line. The "3-D" effect appears when a viewer wears spectacles which have polarized lenses (5 and 6) that correspond to the polarization axes of the polarizing filters.

Recently, stereoscopic video projection systems have become an important display technique in several applications, notably in flight simulators and in the design of automobiles. Stereoscopic video systems operate on the same principle as do stereoscopic film systems except that a film system uses a film for the image source while a video system uses a video source for the image source.

One stereoscopic video production system which utilizes a single projector is the field-sequential approach, as described by Lipton in "Field-Sequential Electronic Stereoscopic Projector," SPIE Vol. 1081, 1989. One problem with the field sequential approach, however, is that a special short persistence green phosphor cathode ray tube (CRT) must be used. The problem with these special CRTs, which typically cost several times the price of a normal green CRT, is that the brightness level is significantly reduced.

Thus, a need exists for a stereoscopic video projection system which is not dependent on the special CRT.

Another type of video projection system utilizes dual projectors, each with a liquid crystal (LC) image forming panel (rather than a single projection having a CRT display). One problem with using a single projector LC projection system with the field sequential approach is that, in the field sequential approach, the projector must run at twice the video field rate. Conventional LC projectors, however, cannot run at that rate because the crystal switching speed is too slow. Thus if LC projection systems are to be successfully used for stereoscopic or three-dimensional projection, it must be by means of the dual projector approach.

One problem with using the LC display projection system in the traditional dual projector approach is that the LC system produces an image with polarized light as an artifact of the image forming means. When projecting a non-stereo image, a polarized video image is of no consequence because the polarization does nothing to degrade the image since the eye is insensitive to polarized light. However, if two polarized images are passed through polarizing filters in the traditional dual projector approach, a severe color shift of the stereoscopic image will result. A further problem is that the brightness of the stereoscopic image may be reduced.

Another problem with using the LC display projection system in the traditional dual projector approach is that the degree of color shift from each projector is different. Such color shifts are unpleasant to view—blue skies may appear to be red, skin tones blue, green grass purple, and so on. Such bizarre skin tones and strange colors of objects which are familiar to the viewer are annoying and intolerable.

Therefore, there is a need to provide a stereoscopic video projection system that would reduce color shift and illumination reduction problems which occur in conventional stereoscopic video projection systems.

SUMMARY OF THE INVENTION

The invention is a synchronized dual projection system which comprises at least two video projectors which project polarized video images when projecting non-stereoscopic images, a means for polarizing the polarized image that each projection system projects, and a means for reducing the color shift which is formed when polarized images from a polarizing projector are synchronized to produce a stereoscopic image.

DETAILED DESCRIPTION

Although a preferred embodiment of the inventive stereoscopic video projection system 10 (shown in FIG. 2) includes LC display projectors 14 and 16, alternative embodiments of the present invention may include any projection system 12 which produces a polarized image prior to passing the image through a polarizing filter for stereoscopic image formation.

Figure 1:
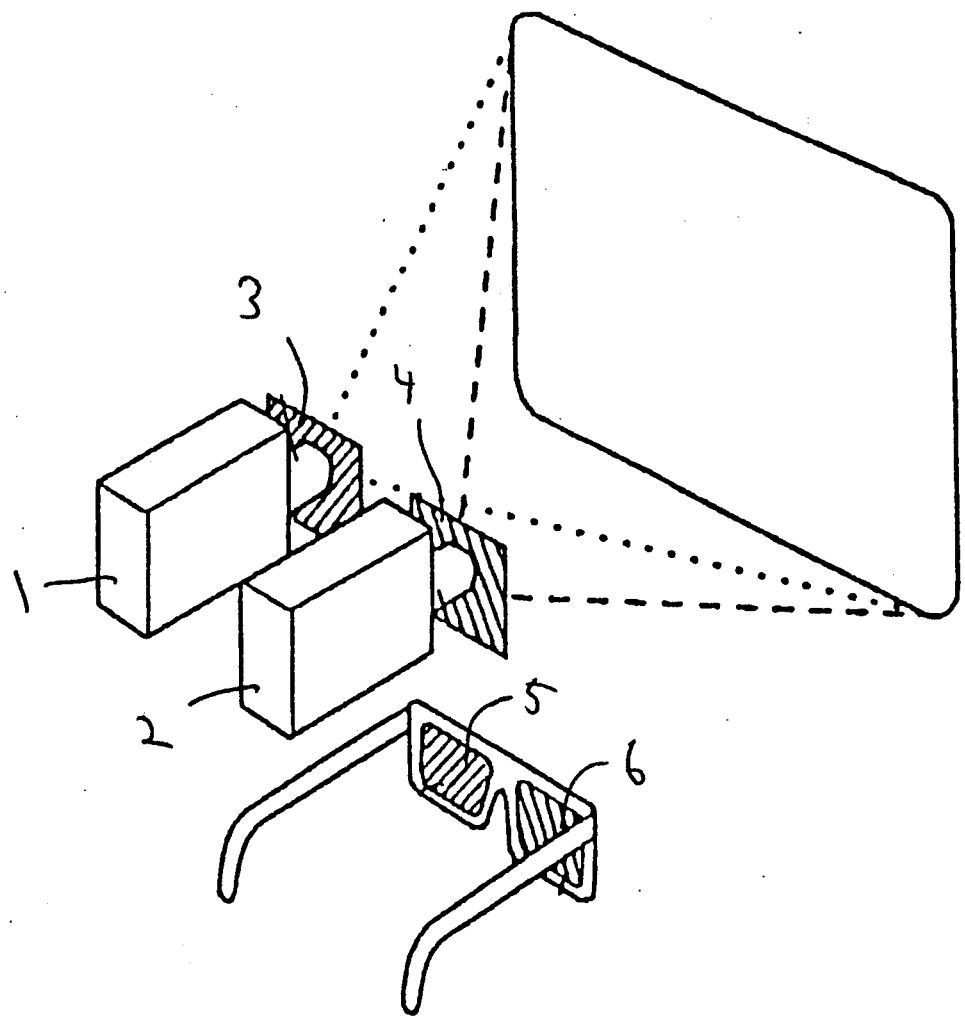
FIG. 1 is a prior art setup for the projection of stereoscopic images using two projectors.
Figure 2:
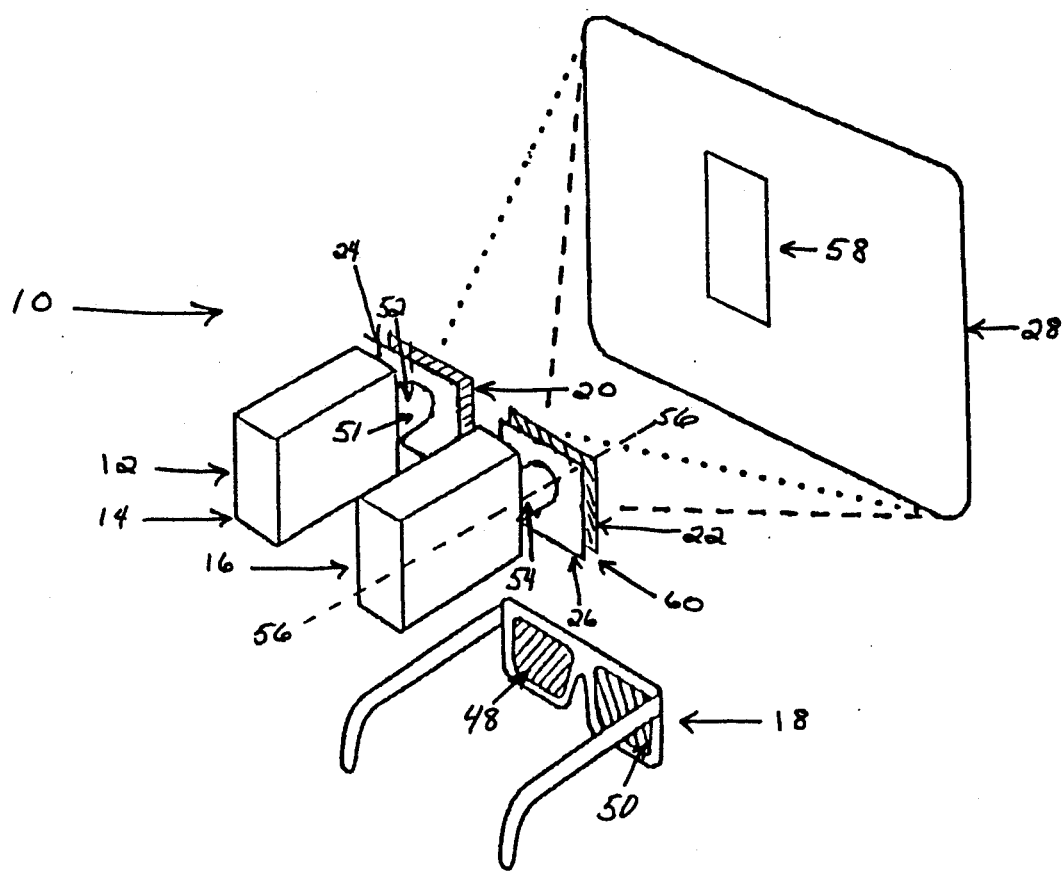
FIG. 2 is a perspective view of an embodiment of the inventive apparatus for the projection of stereoscopic images including means for correcting for anomalous colors.

Referring to FIG. 2, in the preferred embodiment of the present invention, stereoscopic video projection system 10 comprises a left LC display projection system 14, a right LC display projection system 16, polarizing spectacles 18, a left linear polarizing filter 20, a right linear polarizing filter 22, a specially aligned left sheet retarder 24, a specially aligned right sheet retarder 26, and a display screen 28.

Figure 3:
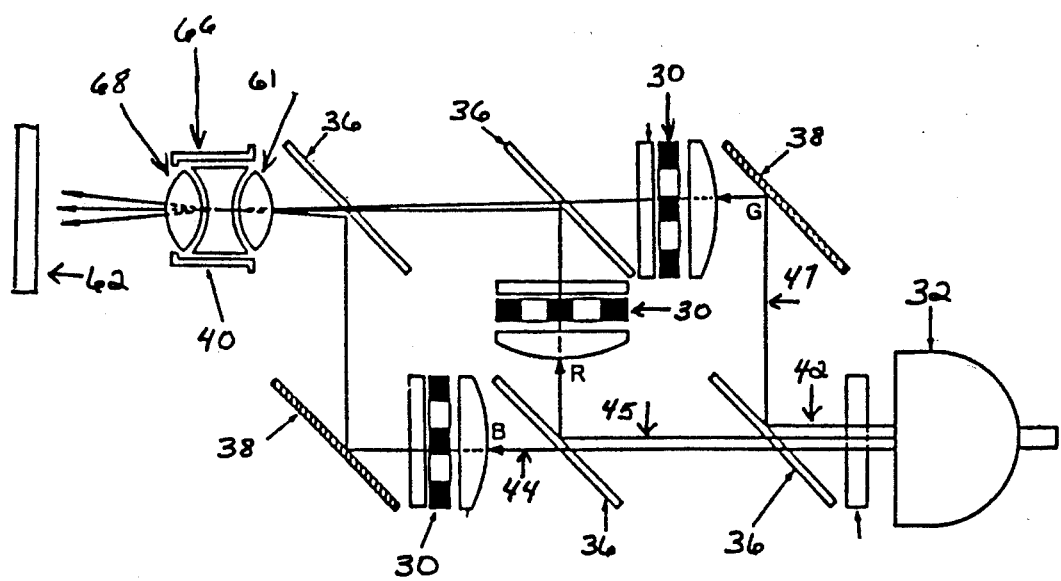
FIG. 3 is a schematic of a conventional means for creating color images with an LC video projector.

LC display projection system 12 can have a conventional design as shown in FIG. 3. The FIG. 3 embodiment of system 12 is comprised of three LC displays 30, a single light source 32, four dichroic mirrors 36, two reflection mirrors 38, and a lens system 40. Elements 30, 36, 38, and 40 will sometimes be referred to as image forming elements.

The image is formed by splitting light beam 42 from light source 32 into a blue beam of light 44, a red beam of light 45, and a green beam of light 47 by means of the two dichroic mirrors 36 adjacent to light source 32. Each dichroic mirror 36, which has a metallic coated surface on a glass base, transmits or reflects a specific color. The beams of light 44, 45, and 47 are passed through the corresponding LC displays 30. Each LC display 30 is displaying a red, green, or blue component of the video signal which has been separated into the three color components. The beams of light 44, 45, and 47, are modulated as they pass through each LC display 30, and are then recombined (using the other two dichroic mirrors 36) and projected through the lens system 40 onto the projection screen (not shown in FIG. 3).

The production of an image using an LC display 30 is dependent upon the light being polarized. It is the polarization of light which produces the necessary optical density. Each LC display 30 is a polarizing image forming element because each LC display 30 is constructed of a LC cell sandwiched between two polarizers. In addition, each dichroic mirror 36 is a polarizing image forming element. In the optical path, the last image forming element of the FIG. 3 embodiment which polarizes is the last dichroic mirror 36 adjacent to lens system 40. Thus, the LC display projection system 12 projects polarized images.

The polarizing spectacles IS have a left polarizing filter 48 and a right polarizing filter 50. Left and right polarizing filters, 20, 22, 48 and 50 are standard prior art sheet linearly polarizing filters. Alternatively, circularly or elliptically sheet polarizing filters may be used.

The linear orientation of the polarizing filters, 20 and 22, for the left and right LC display projection systems, 14 and 16, and the linear orientation of the left and right filters 48 and 50, follow standard established practice, 45° and 135° respectively. Alternatively, other orthogonal orientations are also possible; the left and right polarizer axes, for example, might be parallel to the horizontal and vertical directions.

Preferably, the specially aligned retarders, 24 and 26, are comprised of a standard, substantially quarter-wavelength, green-light frequency, plastic sheet retarder, such as Model 605206 manufactured by Polaroid, Inc. Alternatively, retarders having other parameters may be used, or two or more retarders can be used in (i.e., positioned in the optical path of) each projection system. However, this latter alternative increases the complexity and cost of manufacture, and is in most circumstances not justified.

The screen 28 is well known in the art. Although the screen 28 described is for front projection, which is the common practice, there are also rear screen materials suitable for use in alternative embodiments of the invention, and the teachings here apply to either style of screen. Alternatively, any display surface which has the ability to preserve the characteristics of a polarized beam of light may be used.

Referring to FIG. 2, the left and right specially aligned retarders, 24 and 26, are attached to the corresponding left and right projection lenses, 52 and 54, of LC display projection systems 14 and 16 along the optical path. The left and right polarizing filters, 20 and 22, are laminated to the corresponding left and right specially aligned retarders 24 and 26 so that left and right polarizing filters 20 and 22 are also within the optical path. The plane of the specially aligned retarders 24 and 26 is parallel to the plane of polarizing filters 20 and 22, and the plane of polarizing filters 20 and 22 is substantially perpendicular to a longitudinal axis 56 of projection lens 54.

Prior to laminating retarders 24 and 26 to polarizing filters 20 and 22, retarders 24 and 26 should be specially aligned with respect to the polarizing filters 20 and 22. Such special alignment (to be described below) should be performed because a retarder can only be produced to within a 20% tolerance of its specified value.

Retarders 24 and 26 and polarizing filters 20 and 22 may be aligned by projecting a color test pattern 58 onto screen 28. The test pattern 58 can be made up of color bars generated by a signal generator or other types of test patterns made up of commonly recognizable objects; these sometimes include a picture of a person as a means to adjust for skin tones. In the case of computer generated images it is possible to create and project a similar test pattern.

The special alignment is performed by placing left and right polarizing filters 20 and 22 in the optical path in front of corresponding projection lenses 52 and 54. Polarizing filters 20 and 22 are preferably mounted on a bracket (not shown in FIG. 2) so that they cannot be disturbed and to allow room for the retarders, 24 and 26, to be rotated. The retarders, 24 and 26, are then placed in the optical path between the corresponding polarizing filters, 20 and 22, and the projection lenses, 52 and 54.

Next, each retarder 24 and 26 is rotated about the longitudinal axis 56 of the corresponding projection lens (52 or 54) relative to polarizer 20 or 22, into the position resulting in the best projected image—that is, the projected image that has the best (most accurate) color values and/or the greatest transmission of light. Although retarders have both fast and slow axes, it is not necessary to know the precise orientation of each retarder's slow axis in the system to obtain the desired result. The color values can be judged by removing each retarder/polarizer assembly 60 (comprising elements 20 and 24, or 22 and 26) to view the projected test pattern 58 and to compare the filtered and unfiltered image. When adjusting the retarders, 24 and 26, the spectacles 18 may be worn to see the final effect.

The phrase "specially aligned retarder" is used throughout this disclosure, including in the claims, to denote a retarder which has been aligned with respect to a polarizing filter into the position producing a projected image having the best (most accurate) color values, the greatest transmission of light, or the best combination of color value accuracy and light transmission. "Special alignment" of retarders is preferably performed during the assembly of each device embodying the invention, to compensate for variations which may occur during the manufacture of the retarders.

Once retarders 24 and 26 have been specially aligned, each can be laminated (in its special alignment) to the corresponding polarizing filter, 20 or 22. Lamination is preferred to other methods of affixing retarders 24 and 26 to polarizing filters 20 and 22. For example, lamination is preferred to holding the two sheets in juxtaposition because it will increase the transmission and be a more effective package.

Each retarder/polarizer assembly 60 must then be marked for the handedness of the projector (12 or 16), for which side faces the screen 28, and also for proper orientation of the axis of the retarder/polarizer assembly 60. A mark on the top of each retarder/polarizer assembly 60 may suffice, or a bubble level may be used as part of the filter for a more precise setting.

Each retarder/polarizer assembly 60 may be mounted in a convenient frame (not shown in FIG. 2). For example, it might be hung from a bracket to be mounted in front of the projection lens. The retarder/polarizer 60 might be placed into a retaining ring (not shown in FIG. 2) and slipped over the outer housing 51 of the projection lens 40; this latter method may be favored for lens mounts which do not undergo rotation with zooming or focusing.

The calibration of retarders 24 and 26 must be carried out independently for both left and right projectors, 14 and 16, because the color shift characteristics for the left and right projectors, 14 and 16, may vary due to the orientation of the polarizing filters, 20 and 22. It is the individual aligning of the retarders, 24 and 26, with respect to the left or right polarizing filters, 20 and 22, with the operator watching the projected test pattern 58, that makes the present invention one which is manufacturable at a relatively low price using existing retarder materials. The individual alignment takes into account the variations in retarder product. However, it may be dispensed with if retarders of sufficiently high tolerance may be obtained. Once calibration is carried out for the left or right filter, 20 or 22, it may be used for any projector 12 of the same make and model by a given manufacturer.

The stereoscopic image is formed when the projectors, 14 and 16, project left and right images, respectively, (which may be created by a camera or computer) through the lenses, 52 and 54, and their associated retarder/polarizers 60, to produce left and right perspective images on the screen 28.

The left and right perspective images may be viewed by an observer wearing spectacles 18 with sheet polarized lenses 48 and 50, whose axes are orthogonal and parallel, respectively, to the axes of filters 20 and 22. The result for the observer wearing the spectacles 18 is a stereoscopic effect.

In a variation on the FIG. 3 embodiment, a specially aligned retarder (not shown in FIG. 3) may be located anywhere between polarizing filter 62 and the polarizing imaging forming element nearest filter 62. For example, a specially aligned retarder may be placed immediately at the rear surface 61 of lens system 40, at an intermediate point 66 within lens system 40, or at the front surface 68 of lens system 40. The specially aligned retarder may not, however, be placed between the polarizing filter 62 and the projection screen (not shown in FIG. 3). Moreover, the specially aligned retarder need not be placed in intimate juxtaposition with the polarizing filter 62. The specially aligned retarder and the polarizing filter 62 may be located in any convenient location in the optical path (between filter 62 and source 32).

Given a specially aligned retarder with a proper value of retardation, and the proper orientation of its axis, it is possible to greatly reduce or virtually eliminate color shifts to restore the normal colors to the image being projected, and to improve the transmission of light to the projection screen.

If these steps have been taken, it is possible to produce stereoscopic LC projectors, using polarized light for image selection, which produce images which are neutral in color and free of distracting and peculiar color shifts.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A device for forming stereoscopic video images on a display surface comprising:
    a first synchronized video projection system and a second synchronized video projection system, each video projection system projecting a polarized beam of light, said polarized beam of light of each video projection system being polarized by an image forming element of each video projection system;
    a first specially aligned retarder positioned between said first synchronized video projection system and said display surface so that a polarized beam of light of said first synchronized video projection system passes through said first specially aligned retarder;
    a second specially aligned retarder positioned between said second synchronized video projection system and said display surface so that a polarized beam of light of said second synchronized video projection system passes through said second specially aligned retarder;
    a first polarizing filter positioned between said first specially aligned retarder and said display surface so that said polarized beam of light of said first synchronized video projection system passes through said first polarizing filter; and
    a second polarizing filter positioned between said second specially aligned retarder and said display surface so that said polarized beam of light of said second synchronized video projection system passes through said second polarizing filter.

2. The device of claim 1 wherein each of said first polarizing filter and said second polarizing filter comprises a sheet polarizing filter.

3. The device of claim 2 wherein said sheet polarizing filter comprises a linear or circular sheet polarizing filter.

4. The device of claim 1 wherein each of said first specially aligned retarder and said second specially aligned retarder are substantially one-quarter wavelength thick at green-light frequencies.

5. The device of claim 4, wherein the first specially aligned retarder is attached to the first polarizing filter and said second specially aligned retarder is attached to said second polarizing filter.

6. The device of claim 5, wherein said first specially aligned retarder is laminated to the first polarizing filter and said second specially aligned retarder is laminated to said second polarizing filter.

7. A device for forming stereoscopic video images on a display surface comprising:

a first synchronized liquid-crystal video projection system and a second synchronized liquid-crystal video projection system, each liquid-crystal video projection system projecting a polarized beam of light, said polarized beam of light of each liquid-crystal projection system being polarized by an image forming element of each liquid-crystal video projection system;

a first specially aligned retarder positioned between said first liquid-crystal video projection system and said display surface so that a polarized beam of light of said first liquid-crystal video projection system passes through said first specially aligned retarder;

a second specially aligned retarder positioned between said second liquid-crystal video projection system and said display surface so that a polarized beam of light of said second liquid-crystal video projection system passes through said second specially aligned retarder;

a first polarizing filter positioned between said first specially aligned retarder and said display surface so that said polarized beam of light of said first liquid-crystal video projection system passes through said first polarizing filter; and a second polarizing filter positioned between said second specially aligned retarder and said display surface so that said polarized beam of light of said second liquid-crystal video projection system passes through said second polarizing filter.

8. The device of claim 7 wherein each of said first polarizing filter and said second polarizing filter comprises a sheet polarizing filter.

9. The device of claim 8 wherein said sheet polarizing filter comprises a linear or circular sheet polarizing filter.

10. The device of claim 7 wherein each of said first specially aligned retarder and said second specially aligned retarder are substantially one-quarter wavelength thick at green-light frequencies.

11. The device of claim 10 wherein each of said first specially aligned retarder and said second specially aligned retarder and each of said first polarizing filter and said second polarizing filter are attached together.

12. The device of claim 11 wherein each of said first specially aligned retarder and said second specially aligned retarder and each of said first polarizing filter and said second polarizing filter are laminated together.

13. A device for forming stereoscopic video images, including at least two synchronized video projection systems, each said projection system comprising:
  a. a light source, said light source projecting a beam of light along an optical path;
  b. a polarizing image forming element, said polarizing image forming element located along said optical path;
  c. a lens system, said lens system located along said optical path;
  d. a polarizing filter, said polarizing filter located along said optical path; and
  e. a specially aligned retarder, said specially aligned retarder located between said polarizing image forming element and said polarizing filter along said optical path.

14. The device of claim 13 wherein said polarizing filter comprises a sheet polarizing filter.

15. The device of claim 14 wherein said sheet polarizing filter comprises a linear or circular sheet polarizing filter.

16. The device of claim 14 wherein said specially aligned retarder is substantially one-quarter wavelength thick at green-light frequencies.

17. The device of claim 16 wherein said specially aligned retarder and said polarizing filter are attached together.

18. The device of claim 17 wherein said specially aligned retarder and said polarizing filter are laminated together.

19. A method for improving projection of a stereoscopic image using two liquid-crystal video projection systems, including the steps of:
  a. securing a first polarized filter between a lens system of a first video projection system and a display surface so that a light beam of said first video projection system will pass along a first path through said first polarizing filter;
  b. securing a second polarized filter between a lens system of a second video projection system and said display surface so that a light beam of said second video projection system will pass along a second path through said second polarizing filter, with a longitudinal axis of said second polarizing filter substantially orthogonal to a longitudinal axis of said first polarizing filter;
  c. placing a first retarder along the first path with a first side of said first retarder facing said lens system of said first video projection system and a second side of said first retarder facing said first polarizing filter wherein said first retarder has a normal axis;
  d. rotating said first retarder about said normal axis into a special alignment;
  e. placing a second retarder along the second path so that a first side of said second retarder faces said lens system of said second video projection system and a second side of said first retarder faces said second polarizing filter wherein said second retarder has a normal axis; and
  f. rotating said second retarder about said normal axis into a special alignment.

20. The method of claim 19, wherein rotation of the first retarder into its special alignment and rotation of the second retarder into its special alignment minimizes color shift in the stereoscopic image and maximizes transmission of light comprising the stereoscopic image.

21. The method of claim 19 wherein step (d) includes a final step of laminating said first retarder to said first polarizing filter.

22. The method of claim 20 wherein said first retarder has a substantially one-quarter wavelength thickness at a green-light frequency.

23. The method of claim 20 wherein said first polarizing filter comprises a sheet polarizing filter.

24. A method for reducing a color shift formed when two liquid-crystal video projection systems are used to form a stereoscopic image, the method comprising:
  a. securing a first polarized filter between a polarizing image forming element of a first video projection system and a lens system of a first video projection system so that a light beam of said first video projection system will pass along a first path through said first polarizing filter;
  b. placing a second polarized filter between a polarizing image forming element of a second video projection system and a lens system of a second video projection system so that a light beam of said second video projection system will pass along a second path through said second polarizing filter with a longitudinal axis of said second polarizing filter substantially orthogonal to a longitudinal axis of said first polarizing filter;

c. placing a first retarder along the first path with a first side of said first retarder facing said last polarizing image forming element of said first video projection system and a second side of said first retarder facing said first polarizing filter wherein said first retarder has a normal axis;

d. rotating said first retarder about said normal axis until said color shift has been minimized;

e. placing a second retarder along the second path so that a first side of said second retarder faces a last polarizing image forming element of said second video projection system and a second side of said first retarder faces said second polarizing filter wherein said second retarder has a normal axis; and f. rotating said second retarder about said normal axis until said color shift has been minimized.

* * * * *